NO PRINTED SPECIFICATION AVAILABLE
N. WHITMORE.
Making Cop Tubes.
A. I. No. 86.
A. I. Patented Jan'y. 25, 1848.
5156
X5676
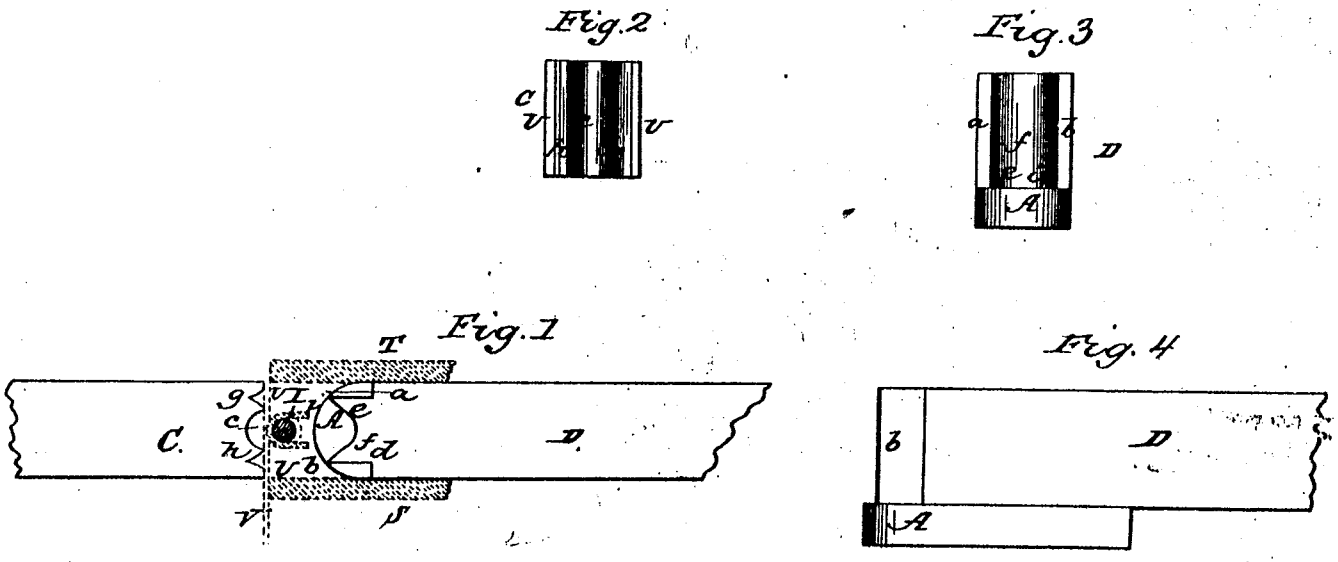
N. PETERS, Photo-Lithographer, Washington, D. C.